Jan. 24, 1933.  G. VON WEBERN ET AL  1,894,966
GRAINING MACHINE
Filed April 19, 1930  5 Sheets-Sheet 2

Patented Jan. 24, 1933

1,894,966

UNITED STATES PATENT OFFICE

GUIDO von WEBERN AND EDWARD WILLIAM HAMANT, OF DAYTON, OHIO, ASSIGNORS TO OXFORD VARNISH CORPORATION, OF DETROIT, MICHIGAN, A CORPORATION OF MICHIGAN

GRAINING MACHINE

Application filed April 19, 1930. Serial No. 445,643.

An object of this invention is to provide an improved graining machine for transferring patterns, such as wood grain and marble for example, to metal panels and the like.

A specific object is to provide a graining machine which will effectively handle large blanks varying greatly in thickness.

A further object is to provide for supporting blanks to be grained in such manner that notwithstanding large surface areas, accurate printing contact will be maintained.

Still another object is to provide an improved automatically operated work feeding arrangement for a graining machine, particularly adapted to operate on very large work blanks.

Another object is to provide a pigment supply device, including an ink receptacle so arranged that the entire pigment supply may be easily and quickly changed whenever it is desired to change the color of pigment used, as when changing pattern rolls on the machine.

Other objects include the provision of a graining machine in which pattern rolls of various sizes may be mounted and the pattern transferred therefrom by simple adjustment of the machine; in other words, without requiring substantial changing of parts on the machine each time one size of pattern roll is substituted for another.

A further object is to provide an improved driving device for a conveyer in a graining machine, whereby the conveyer may be raised and lowered substantial distances without having to make complicated adjustments and without having to remove and replace parts of the machine.

Other objects and features of the invention will become apparent from the following description relating to the accompanying drawings showing the preferred forms. The essential characteristics are summarized in the claims.

Figure 1:
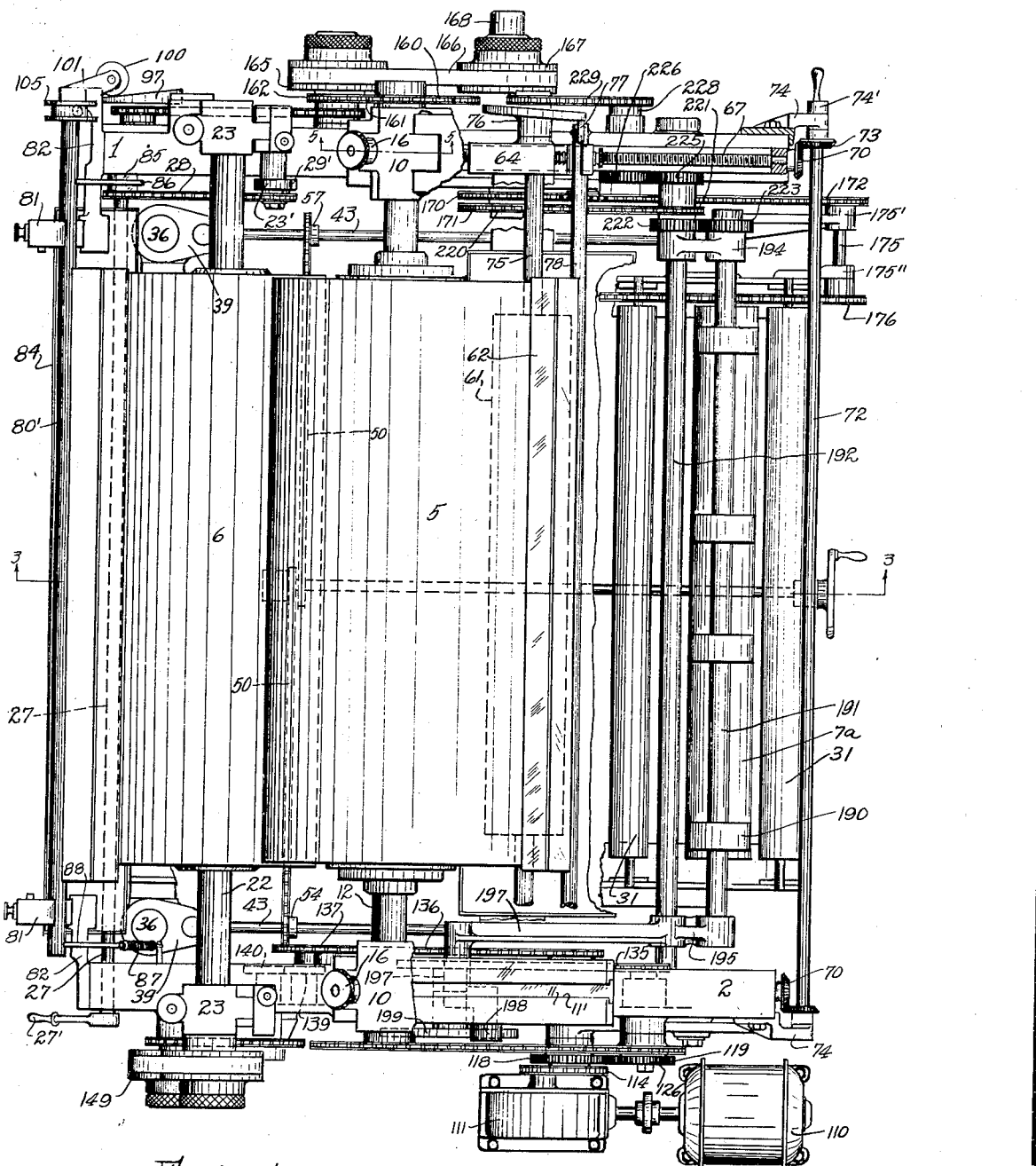
Figure 2:
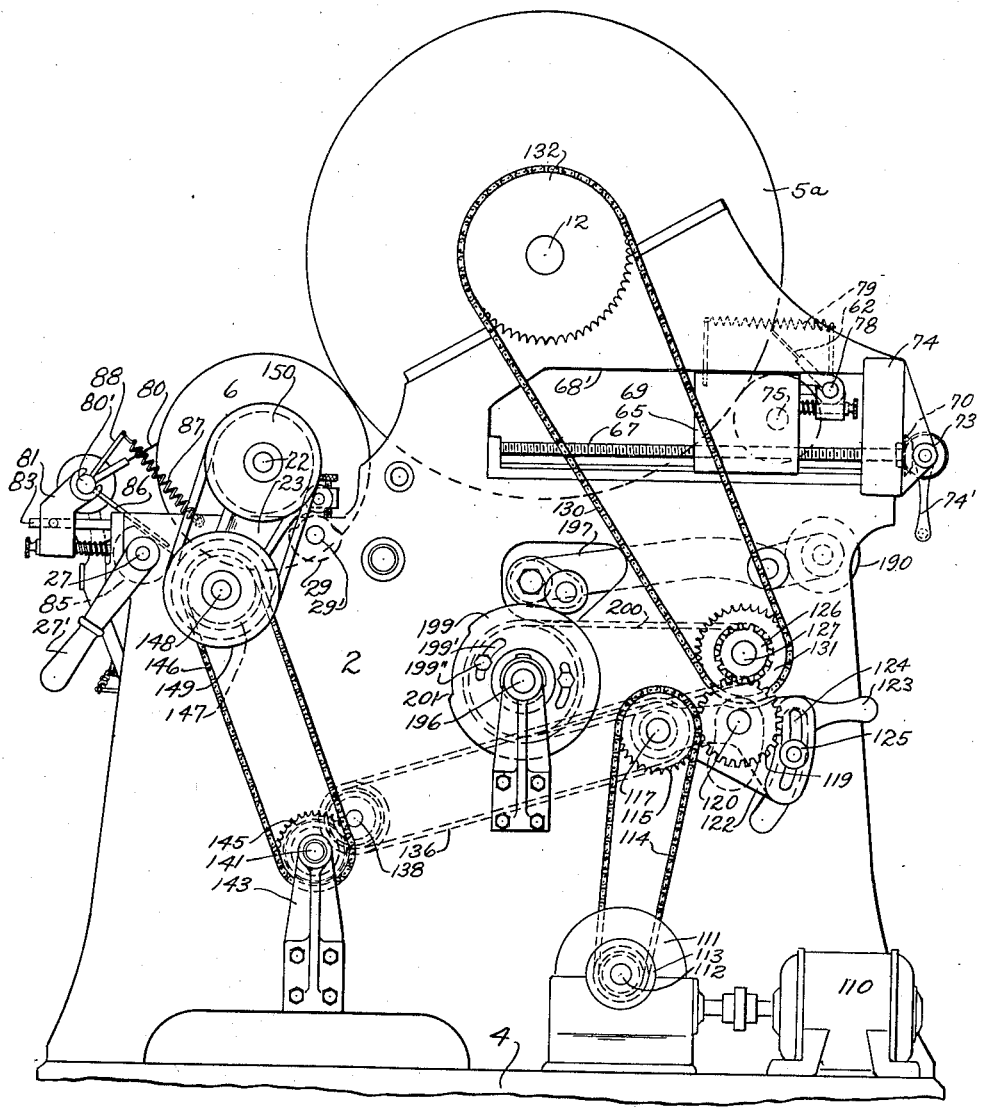
Figure 3:
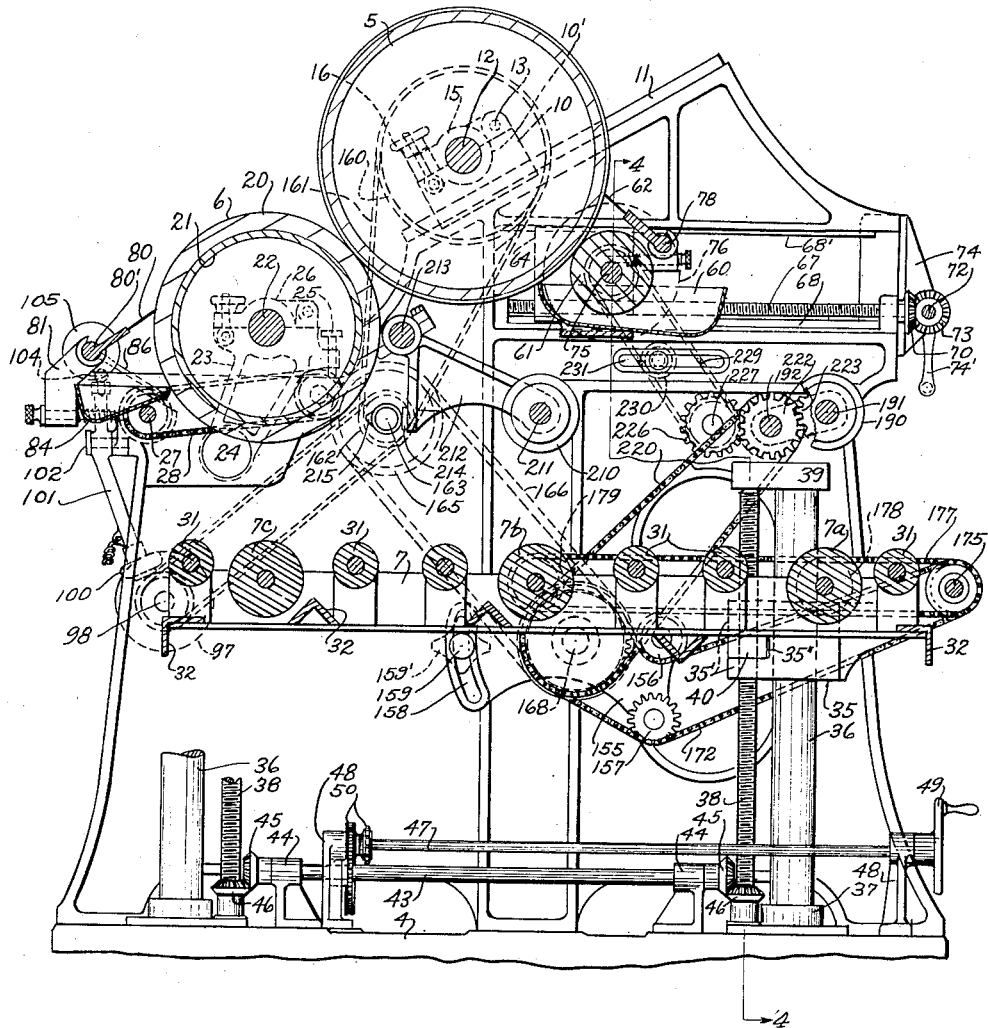
Figure 4:
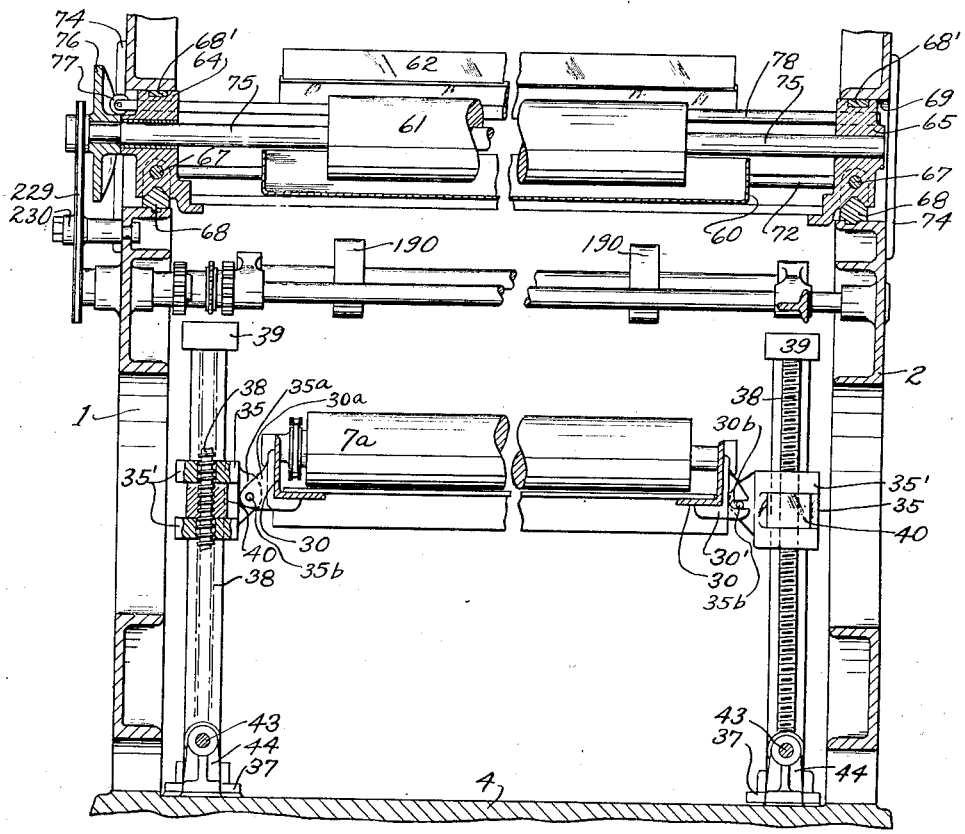
Figure 5:
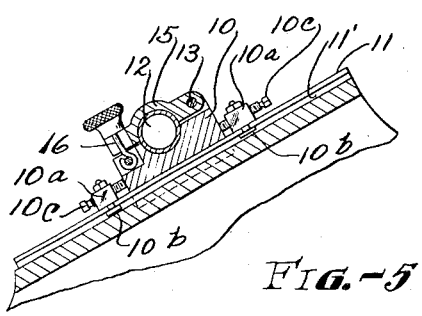
Figure 6:
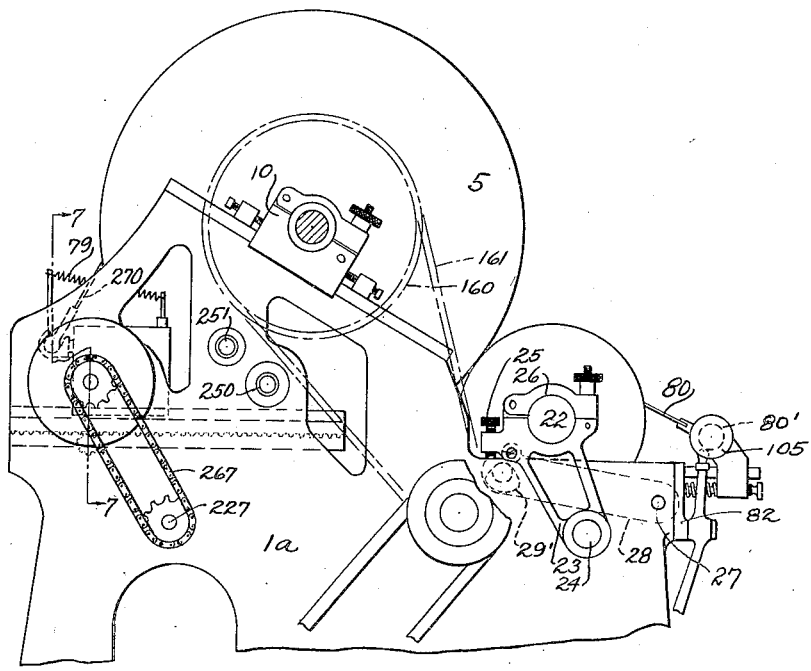
Figure 7:
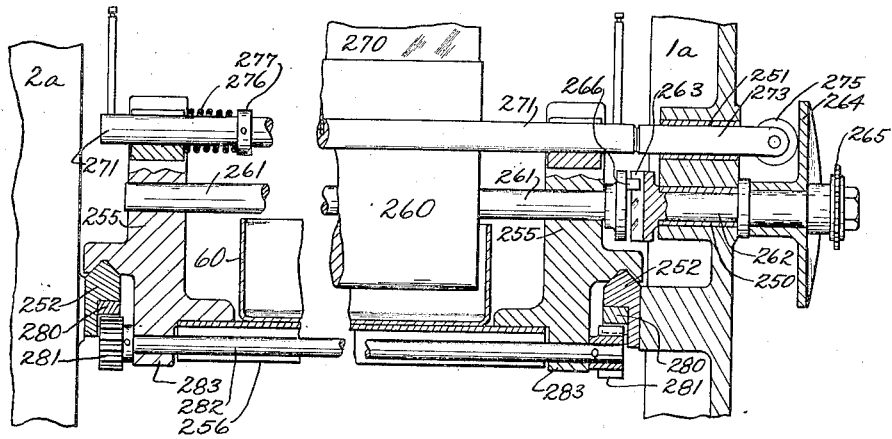

In the drawings Fig. 1 is a plan view, showing the entire machine; Fig. 2 is an end elevation thereof; Fig. 3 is a longitudinal sectional view taken substantially along the line 3—3 of Fig. 1; Fig. 4 is a transverse sectional view taken substantially along the line 4—4 on Fig. 3; Fig. 5 is a sectional detail view as indicated by the line 5—5 on Fig. 1; Fig. 6 is a fragmentary side elevation of the machine, showing a modification of part of the machine, and Fig. 7 is a fragmentary sectional end elevation showing the modification more in detail, the section being indicated at 7—7 in Fig. 6.

Referring in detail to the drawings, and first to Fig. 1, substantially all the major parts of the machine are supported on side frame members, designated 1 and 2, which rest on and are connected by a suitable base 4.

Supported on the side frame members and base are brackets and bracket arrangements, which will be hereinafter described in detail, for respectively supporting a pattern roll 5, a transfer roll 6 and a conveyer 7 for work to be grained. Both the pattern roll and transfer roll are removably arranged on their brackets, this being practically essential in order to change the pattern on the pattern roll from time to time and to service the gum portion of the transfer roll. The supports for the pattern roll comprise slide blocks, shown at 10 on inclined slideways 11. The blocks and slideways are substantially identical and only one will be described in detail.

As shown in Figs. 1 and 5, the slideway 11 comprises two flat elongated parallel plates surmounting the side frame member and overhanging the same at each side edge. The block 10 straddles the plate. To hold the blocks 10 in set position there are shown positioning members 10a at both ends of each block. These may be mounted in a dove-tail slot 11' in slide 11. As shown, the blocks 10a carry T-bolts 10b with the heads thereof underhanging the under surfaces of the dove-tail slot, which T-bolts serve to clamp the blocks 10a firmly in position on the slide members 11. These blocks 10a are initially set in approximate position in accordance with the size of the pattern roll. All of the blocks 10a carry set screws 10c adapted to bear against the respective blocks 10, which, by reason of adjustment of the set screws, may, after such initial setting, be accurately positioned to secure uniform contact pressure between the pattern roll and the adjacent rolls.

The blocks 10, (see Fig. 5) are recessed to form bearing sockets for the shaft 12 of the pattern roll. Movably mounted on each block 10, as on a pivot pin 13, is a top bearing member or cap 15, shown as held in place by a swingable eye-bolt and hand nut clamping arrangement 16. The arrangement is such that both top bearing members 15 may be swung back to allow the removal of the pattern roll shaft.

The pattern roll may be an intaglio cylinder such as a continuous etched copper plate, and this contacts with the gum surface of the transfer roll 6, shown as comprising a continuous annulus of gum material, such as congealed glue and glycerine, indicated at 20 supported on a cylindrical hollow core 21, the latter being mounted on a suitable shaft 22. The shaft 22 is carried in movable brackets 23 (see Figs. 3 and 6), pivotally secured, as at 24, to the respective side members of the frame.

For the purpose of adjusting the transfer roll toward and away from the pattern roll, the brackets 23 carry set screws 25 bearing against the top edge surfaces of the frame members 1 and 2, and which serve to properly adjust both ends of the transfer roll individually in the desired pressure contact with the pattern on the pattern roll. The transfer roll shaft 22 is, as shown, removable from the brackets 23 by reason of pivoted bearing cap members 26 mounted substantially the same as the previously described cap members 15 for the pattern roll shaft.

Both brackets 23 are arranged to be manually swung back (away from the pattern roll) whenever the machine is not running to avoid standing contact between the transfer roll material and the pattern. As shown, there is a cross shaft 27 having sprocket and chain connections 28 with short cam shafts 29. These carry cams 29′ adapted to force against cam followers 23′ on the brackets 23, when the shaft 27 is turned as by a suitable handle 27′.

The conveyer 7 comprises, as shown, a general frame, the side members of which are shown in Figs. 3 and 4 at 30. These are angle sections with horizontally disposed flanges connected by suitable cross members, shown as angle sections 32. Carried on the frame members 30 are a plurality of large and small rollers adapted to support work and carry it into contact with the transfer roll 6. The large rollers are indicated at 7a, 7b and 7c. The small rollers simply constitute work guides and are marked 31. The large rollers 7a and 7b are elements of working feeding mechanisms to be presently described, and the roller 7c is the platen or backing roll for the transfer roll 6.

To provide for vertical adjustment of the conveyer, the side frame members 30 of the conveyer frame are attached to respective sliding blocks 35 which are all similar in construction and are similarly numbered. The detailed construction of the blocks and supports is shown best in Figs. 3 and 4. The blocks are mounted on upright guide bars 36 secured as on pedestal members 37 in upright position on the base 4. There are four such guide bars, two at each side of the machine, and a block 35 on each bar. Each block may be suitably secured to the conveyer frame members 30 as by cooperating brackets 30a and 35a pinned together as at 35b.

It is desirable in some cases, to provide for relative inclination between the conveyer or work support and the transfer roll and feed rolls to accommodate blanks with generally non-parallel surfaces. I may provide for this by the arrangement shown in Fig. 4, wherein the bracket 30a at the right has an elongated opening or slot for receiving the pin 35b. The corresponding bracket 30a at the left has a round opening for receiving the pin. By this arrangement the conveyer may be transversely tipped materially from the horizontal position shown, without binding.

Adjacent each guide bar is an upright screw 38, the screws being supported in suitable bearings on the respective pedestal members 37 and overhanging bearing brackets 39 surmounting the guide bars. Each screw extends freely through upper and lower ears 35′ on the respective blocks 35 (see Fig. 4, left side) that is to say, the openings in the ears to receive the screws are not threaded and are slightly larger than the screws. Seated between the ears 35′ of each block, as shown in Fig. 4, is a threaded nut 40, the nut being slidable horizontally slight distances in all directions, being guided on the horizontal adjacent surfaces of the ears 35′. The advantage of this is that the screws do not have to be accurately located with respect to the guide bars and blocks 35 in order to prevent binding of the screws. Each of the nuts may have a flat side closely adjacent a flat surface on the respective slide block, as at 35″ (Fig. 3), to prevent turning of the nut.

We have arranged for turning all of the screws simultaneously as follows: At each side of the machine, and extending parallel to the side frame members 1 and 2, are horizontal shafts 43. These shafts may be mounted in suitable brackets 44 carried on the base plate 4. The shafts are provided with beveled gears 45 in permanent mesh with corresponding bevel gears 46 rigid on respective upright screws 38. The arrangement for simultaneously turning both shafts 43 comprises, as shown, a centrally located longitudinally extending shaft 47 supported on brackets 48 and provided with a hand wheel 49 at the front end of the machine, which shaft has individual sprocket and chain connections 50 with the shafts 43.

In operation, it will be seen that turning the hand wheel 49 will raise or lower all four corners of the conveyer frame at once. The frictional contact between the screws 38 and the nuts 40 is sufficient to lock the conveyer frame in position, but additional means (not shown) may be provided if desired.

Two of the conveyer rolls, namely 7a and 7b, are positively and continuously driven to advance the work on the conveyer to the impression transferring position, that is, beneath the transfer roll 6. These rolls 7a and 7b cooperate with intermittently operated vertically reciprocating feed rolls 190 and 210, see Figs. 1 and 3. The driving arrangements for the conveyer rolls just mentioned and one of the intermittently operated feed rolls, as well as the supports for the feed rolls, will be later described.

The pattern roll is provided with pigment supply devices which, as shown, comprise an ink pan 60, an ink conveyer roll 61 and a doctor blade 62.

A feature of the invention is that the entire pigment supply mechanism may be easily and quickly removed from the machine and a similar mechanism substituted without having to dismantle the machine or the driving parts for this mechanism. This is particularly useful in a machine such as shown, wherein the pattern roll is adapted to be removed and a different roll substituted, since different patterns call for different color pigments. By making the pigment supply unit removable and replaceable with another unit, it is not necessary to hold up the production of the machine for a period of time necessary to completely clean the pigment supply unit mechanism.

As shown in Figs. 1 to 4, the roll and doctor blades are carried on suitable blocks 64 and 65 which are slidably mounted in respective frame members 1 and 2. The blocks 64 and 65 may be simultaneously adjusted by means of respective screws 67 mounted on slide rail members 68 carried in respective openings 69 in the side frame members. The top edges of the openings may also have slide rails 68' for the blocks. To turn both screws simultaneously, both may have beveled gears 70 at their outer ends, connected by cooperating bevel gears 73 on a cross shaft 72 extending across the front of the machine, as shown in Figs. 1 and 3, and carried on brackets 74. The shaft may be turned by a suitable crank 74' to thereby move the slide blocks 64 and 65 in and out. It will be seen that this movement of the blocks 64 and 65 may be utilized for adjusting the contact pressure between the ink roll 61 and the pattern roll, but primarily it is to enable different sized pattern rolls to be used in the same machine without requiring time-taking adjustments. For example, where a very large pattern roll is used, such as indicated at 5a in Fig. 2, the slide blocks 64 and 65 are drawn toward the front of the machine a considerable distance from the position which they occupy in connection with the roll shown in Figs. 1 and 3.

It is desirable to reciprocate the doctor blade 62 parallel to the pattern roll axis to prevent the formation of grooves or ridges in the roll, and for this purpose, the shaft 75 of the ink roll 61 is extended at one end to carry a face cam 76. The cam forces inwardly on a cam follower 77 carried on the end of a supporting shaft 78 to which the blade 62 is rigidly secured. A suitable spring (not shown) may be used to carry the follower into contact with the cam. Springs 79 maintain the doctor blade in yielding contact with the pattern roll. Suitable means which will be hereinafter described drives the ink roll shaft and, of course, the cam.

It will be noted that the entire pigment supply mechanism, including the slide rails 68, the slide blocks, the ink roll, the scraper and the reciprocating cam therefor, may be removed from the front of the machine as a unit, it being necessary to first remove the brackets 74 which close the slideways for the blocks and reinforce the frame castings 1 and 2.

The transfer roll 6 is provided with a scraper blade 80 which contacts with the yielding surface of the transfer roll, after the pigment pattern has been transferred to the subject being grained, and scrapes the excess pigment from the transfer roll. This blade is carried on a shaft 80' in suitable brackets 81. The brackets 81 are in turn yieldingly and slidably carried on inwardly extending rigid arms 82 (Fig. 1) having horizontally extending pins 83 to support the blade holding brackets. The arms 82 are supported by respective main frame members 1 and 2. The pigment scraped off the transfer roll falls into a receiving tray or pan 84 also carried on the arms 82.

It is desirable to remove the scraper blade 80 from contact with the transfer roll whenever the machine is shut down to avoid deforming the gum thereof by the blade. This may be done by means of the shaft 27, previously described. The shaft 27 carries a cam 85 underhanging an arm 86 on the shaft 80'. The blade may be normally held in scraping contact with the roll 6 by a tension spring 87 acting on an arm 88 on the shaft 80'.

The scraper blade 80 is adapted to be reciprocated horizontally in order to more efficiently scrape the roll 6. The reciprocating arrangement comprises a cam 97 on a suitable shaft 98 carried on the frame member 1. The drive for this shaft will be hereinafter described. The cam contacts with a roller 100 on an arm 101 secured to the side frame member 1. The arm is pivoted at 102 to the side frame member 1 and the upper end 104 of the arm rides in a collar 105 (see Fig. 1) near the end of the shaft 80'. The cam rotates continuously during the time the machine is driven, thereby continuously reciprocating the scraper blade.

All the rotating and reciprocating elements above described are preferably driven from a single source of power. This, as shown, comprises a motor 110 mounted at one side of the machine on the base plate 4. The motor has the usual connections for driving a reduction gearing unit 111 mounted adjacent the motor and on the base plate 4 and having a final driven shaft 112. The shaft carries a sprocket 113 which drives a sprocket chain 114 running over a sprocket 115 on the machine frame member 2. The sprocket 115 is carried on a stub shaft 117 mounted in the side frame member 2. In addition to the sprocket the stub shaft carries a spur gear 118 (Fig. 1) which meshes with and drives a spur gear 119 carried on a stub shaft 120. In order to change the driving speed of the pattern roll as its diameter is changed, the stub shaft 120 is supported in a pivoted bearing supporting bracket 122, mounted on the outside of the frame member 2 and arranged to be adjusted about the axis of the stub shaft 117 as by means of a handle 123. The bracket 122 has a guiding slot 124 which receives a clamping stud 125 by which the bracket may be held in adjusted position rigid with the side frame member 2. The spur gear 119 meshes with a spur gear 126 on a shaft 127 in fixed position in the frame member 2. The pattern roll is driven from the shaft 127 by reason of a sprocket chain 130 connecting suitable sprockets 131 and 132 on the shaft 127 and the roll shaft respectively. The gear 126 is removable from its shaft and whenever a different sized pattern roll is substituted for the one then on the machine, it is only necessary to substitute a correspondingly different sized gear for 126 to maintain the same peripheral speed of the pattern roll as before. Maintaining a definite speed is, of course, necessary where both the pattern and transfer roll are positively driven, as in the present machine, and as distinguished from a machine wherein one roll drives the other by friction.

Tracing the drive for the transfer roll from the shaft 117, driven as above described, this drive includes a sprocket 135 on the inside of the frame member 2 and carried rigidly on the shaft 117, Fig. 1. The sprocket 135 drives a chain 136 and this in turn drives a sprocket 137 mounted on a stub shaft 138 carried in the side frame member 2. The shaft 138 drives a spur gear 139 meshing with a spur gear 140 on a stub shaft 141. The latter shaft is supported partly by the frame member 2 directly, and partly by a separate bracket secured to the frame member 2. Between the bracket 143 and the side frame member 2, there is a sprocket 145 driving a chain 146 which in turn drives a sprocket 147 on a shaft 148 mounted on the side frame member 2 above the shaft 141. The shaft 148, as shown in Figs. 1 and 2, carries an adjustable V pulley 149. A similar pulley 150 is carried on the end of the transfer roll shaft 22. The purpose of an adjustable V pulley arrangement is to provide fine adjustment in the drive between the shaft 148 and 22 in order to synchronize the peripheral speeds of the transfer roll and pattern roll and prevent blurring of the transferred pattern on the transfer roll in the event of changes in transfer roll diameter common in this type of machine. The adjustment is effected by moving the elements of the pulleys with respect to each other, as described in the prior application Serial No. 374,100, filed June 27, 1929, owned by the assignee hereof, causing the shafts 148 and 22 to be driven at the same speed or in overdriving or underdriving relationship, as required by the relative sizes of the transfer and pattern rolls.

The conveyer rolls 7a and 7b are driven from the pattern roll shaft 12, which drive will now be described. The pattern roll shaft 12 carries a sprocket 160 at the end adjacent the frame member 1, which drives a chain 161 passing over a sprocket 162 on a short shaft 163 carried in the frame member 1. The shaft 163 has an adjustable V pulley at 165, similar to those at 149 and 150. This, by means of a V belt 166, drives the adjustable V pulley 167 on a short shaft 168, also carried by the frame member 1 and extending through it. On the inside of the frame and mounted on the shaft 168 are two sprocket wheels 170 and 171, as shown in Fig. 1. The sprocket wheel 170, through a chain 172, drives a sprocket on a lay shaft 175, which latter shaft is carried on the conveyer frame in suitable brackets 175' and 175'. Also carried on the shaft 175, is a sprocket 176 which drives a horizontally disposed chain 177 (see Fig. 3) in permanent driving connection with both conveyer rolls 7a and 7b, these having sprockets thereon at 178 and 179 respectively.

Because the conveyer must be operated at various heights, it is necessary to provide a considerable length of chain at 172. To take up the slack in this chain, we provide an idler arrangement, including a swingable arm 155, (Fig. 3), which is pivoted adjacent the frame member 1 and about the shaft 168. The arm carries two idler sprockets 156 and 157 bearing downwardly on the chain 172. The arm has a rearward extension with an arcuate slot 158 through which, and the frame member 1, a clamping bolt 159 extends. The outer end of the bolt carries a hand nut 159' by which the arm may be released and relocked as required by different elevations of the conveyer.

Operating above the conveyer and registering with the conveyer rolls 7a and 7b are sets of feed rollers 190 and 210 on vertically swinging frames. The frames are automatically raised and lowered during the operation of the machine, to receive work and progress it through the machine on the conveyer.

The set of feed rolls 190 comprise, as shown, a series of short resilient disks on a shaft 191, see Figs. 1 and 2, supported in a rocking frame pivoted about a cross bar or shaft 192 having suitable end supports in the side frame members 1 and 2. The rocking frame comprises an arm 194 near the frame member 1, and an arm 195 near the frame member 2. The arm 195 is extended rearwardly or to the left, as shown in Fig. 1, and is there provided with a lateral extension 197 carrying a cam follower 198. The cam follower is actuated by a cam, best shown in Figs. 1 and 2 at 199 on a stub shaft 196, the shaft being driven by means of a sprocket chain 200 from the shaft 127, previously described. The cam has a depression 201 on one side which at predetermined intervals allows the cam follower 198 to drop and thereby raise the feed rollers 190 a sufficient amount to allow a new piece of work to be easily inserted between the feed rolls 190 and the conveyer roll 7a. As the arcuate distance of the depression 201 is relatively short, the feed rollers 190 on the shaft 191 will, except for short intervals, bear down on the work and keep it moving through the machine. The period of operation of the rollers may be varied by an arcuate adjustment device, shown in Fig. 2. This comprises a series of arcuate slots 199′ and clamping screws 199″ for fastening the cam in various turned positions on the shaft 196.

It is desirable to drive the set of feed rolls 190 as well as the conveyer roll 7a with which these register, particularly in case the work is large and heavy, to keep it moving through the machine. To do this, there is provided a sprocket chain 220 connecting the sprocket 171, previously mentioned as on the shaft 168, and a similar sprocket 221 on the shaft 192. Rigid with the sprocket 221 and carried on the shaft 192 is a spur gear 222 meshing with a spur gear 223 on the shaft 191, which carries the feed rollers. The spur gear arrangement permits the raising and lowering of the feed rollers without stretching the driving chain 220. The ink roll 61 may also be driven from the shaft 192 by reason of a spur gear 225 meshing with a spur gear 226 on a shaft 227 carried in the side frame member 1, which the latter shaft carries, exteriorly of the frame member 1, a sprocket 228, which through a chain 229, drives the shaft 75, previously described, on which the ink roll is supported.

Incidently, since the ink roll 61 is carried from one position to another on the slide blocks 64 and 65, it is desirable to provide means to take up the slack in the chain 229. As shown in Fig. 3, there is a sliding idler 230 carried in a slot 231 in the frame member 1, which idler may be adjusted in any desired position along the slot to take up the slack in the chain, irrespective of the position of the bearing blocks and ink roll.

The support for the set of feed rollers 210 comprises a pair of arms 212, one of which is illustrated in Fig. 3. The arms are pivoted about a cross shaft 213 suitably supported in the main frame members 1 and 2. The arm shown in Fig. 3 has a cam follower at 214 arranged to engage a cam 215 on the shaft 163, previously described, and which carries the V pulley 165. The relationship of the cams 215 and 199 is such that the rollers 190 and 210 are raised alternately in order to keep the work progressing through the machine without imposing the burden of driving the work on the transfer roll, and in order that as the advancing edge of the work reaches the rollers 7b and 210, these will be separated to receive it.

In connection with Figs. 1 to 4, an arrangement has been described by which a single machine is adapted to handle a large number of sizes of pattern rolls. In changing from one size to another, it is, of course, necessary to adjust the drive of the rolls. Simply by means of removing and replacing the gear 126 (Fig. 2) one may coordinate the peripheral speeds of the pattern and transfer rolls, insofar as the two sizes of rolls shown is concerned, although as a matter of fact, it is also necessary to vary the conveyer drive. This latter variation may be effected by means of the V pulley and belt arrangement 165—167. This also changes the ink roll speed. If desired, the last adjustment may be obviated by having a supply of sprockets and chains 160—161 which are individually suited to the different sizes of pattern rolls.

The arrangement by which the pigment applying mechanism may be shifted, including the ink roll, pan and doctor blade, in changing from one size pattern roll to another, also has an important function, namely that it allows the pigment applying mechanism to be drawn forwardly as a unit for cleaning the ink pan, for example, as well as servicing and adjusting the other parts of the pigment applying mechanism. If desired, the pigment applying mechanism may be removed as a unit from the front of the machine simply by removing the brackets 74 from the respective side frame members 1 and 2 and sliding the screw mechanism, including the rails 68 endwise out of the frame openings 69. This arrangement also permits the pigment applying mechanism to be mounted in the machine as a complete sub-assembly.

Since most graining work may be handled with two sizes of pattern rolls, it is desirable in some cases to provide only for these two sizes. In such events, the machine may be somewhat simplified by the modified arrangements shown in Figs. 6 and 7. In Fig. 6, one of the side frame members is shown as modified to some extent from that shown in Fig. 3 and is designated 1a. The parts that are the same in this figure as in the other figures are numbered in accordance with the previous description. Within the frame members and slidable on suitable rails 252 similar to the rails 68 of the previously described arrangement, are sliding bearing blocks 255 forming main supports for the pigment applying mechanism elements. The blocks 255 may be joined rigidly by an inverted channel 256 secured therebelow in any suitable manner, as shown in Fig. 7. The ink roll 260 and the doctor blade 270 are carried on respective shafts 261 and 271. These shafts both stop short of the side frame members in order to permit the frame formed by the blocks 255 and cross member 256 to be slid freely along the rails 252.

To support the driving mechanism for the shafts 261 and 271, the frame member 1a has two sets of openings 250 and 251. Secured in the selected opening 250 is a stub shaft assembly comprising a central stub shaft 262 carrying a transversely slotted head 263 at its inner end and a cam and sprocket 264 and 265 respectively at its outer end. These last mentioned elements correspond in function to the similar members on the shaft 75 of the other group of figures. The shaft 261 carries, adjacent the transversely slotted head 263, a longitudinally extending eccentric pin 266 which is normally seated in the transverse slot. As the stub shaft 262 is turned, this, through the slot and pin connection, drives the ink roller, notwithstanding some non-alignment between the shafts 261 and 262 occasioned by fine adjustment of the pigment applying mechanism in compensating for wear on the ink roll 260, for example.

To impart reciprocating movement to the shaft 261, there is a slidable stub shaft 273 mounted in the selected opening 251, the stub shaft carrying a cam follower roller 275 corresponding to the cam follower 77 of the other group of figures. A suitable spring is shown at 276 reacting between one of the slide blocks 265 and a collar 277 on the shaft 271 for holding the cam follower in contact with the cam. It will be seen that as the fine adjustment of the pigment applying mechanism previously mentioned is made, the shafts 271 and 273 may become disaligned, but this is immaterial so long as they remain in abutting contact, which they naturally will because the necessary adjustment is usually slight.

Because of the slot and pin drive between the shafts 261 and 262 and the sectional doctor blade reciprocating shaft, the pigment applying mechanism may be slid forwardly as a unit for inspection and adjustment at any time without having to remove the roll and blade driving mechanism; that is to say, the cam, sprocket chain, etc., as will be obvious.

The pigment applying mechanism is, of course, fairly heavy and it would ordinarily be very difficult to move it on the slide rails. Any binding action is prevented however, by reason of the provision of racks 280, shown as mounted on the slide rails, which racks are in constant mesh with pinions 281, both rigid with a cross shaft 282 supported in suitable depending ears 283 on the respective slide blocks. This rack and pinion arrangement prevents either of the blocks from binding on the slide rails by tending to travel ahead of the other, and consequently the whole mechanism may be easily slid by applying horizontal force to either block.

When the driving members of the pigment applying mechanism, as shown in Figs. 6 and 7, are moved from one position to the other in being adjusted to change from one size pattern roll to another, it is not necessary to change the driving chain 267 for driving the sprocket wheel 265, because the shaft 227 (see Figs. 3 and 6) is located equal distances from both openings 250. Furthermore, no idler arrangement is necessary for the chain.

We claim:

1. In a graining machine, a pattern roll and a transfer roll, a frame supporting said rolls, means for movably mounting the pattern roll, including an inclined slideway disposed above the main portion of the frame, whereby pattern rolls of various diameters may be mounted in cooperative relation to the transfer roll, an ink applying mechanism, including an ink roll and supply receptacle unitarily mounted in cooperative relation to the pattern roll, and means to adjust the mechanism substantial distances while maintaining the ink roll axis in accurate parallelism with the pattern roll.

2. A graining machine, comprising, a main frame, a pattern roll support thereon adjustably arranged to carry pattern rolls of different sizes, means to transfer the pattern to work in the machine, and a pigment applying device for the pattern roll comprising an ink roll, ink pan, and a slidable sub-frame therefor, there being a driving device for the roll, carried partly on the sub-frame and partly on the main frame, the sub-frame being movable material distances on the main frame without affecting said driving device to require disconnection thereof, whereby changing from one pattern roll size to another is facilitated.

3. In a graining machine, two side frame members, a pattern roll removably supported on top of the frame members, means to apply graining pigment to the roll, said means comprising an ink roll, a doctor blade, and an ink pan unitarily mounted on a sub-frame within the side frame members and adapted to be moved away from the pattern roll toward one end of the machine a considerable distance, there being screw devices associated with respective frame members and adapted to move the pigment applying means, and means drivingly connecting said screw devices, whereby power to operate the screws may be applied at one point.

4. In a graining machine, a main frame, pattern transfer mechanism including a pattern roll, a pigment applying unit therefor comprising a sub-frame, an ink roll and a doctor blade carried on the sub-frame, said blade being adapted to be reciprocated in a direction parallel to the pattern roll axis, and a driving mechanism for turning the ink roll and reciprocating the doctor blade, said driving mechanism being supported wholly by the main frame independently of the sub-frame, the connections from the driving mechanism to the roll and blade being established solely by moving the sub-frame adjacent the mechanism.

5. In a graining machine, a main frame, pattern transfer mechanism including a pattern roll, a pigment applying unit therefor comprising a sub-frame, an ink roll and ink supply receptacle carried on the sub-frame, and a doctor blade, said blade being adapted to be reciprocated in a direction parallel to the pattern roll axis, a driving shaft for turning the ink roll, said driving shaft being supported wholly by the main frame independently of the sub-frame, the connections from the driving shaft to the roll being established solely by moving the sub-frame adjacent the driving shaft.

6. In a graining machine, a transfer roll adapted to transfer a pigment pattern to work, means for supporting the work, a pattern roll support adjacent the transfer roll and comprising two inclined frame members, each having slideways thereon, bearing brackets slidable on the slideways and arranged to removably support a shaft for such pattern roll, and means on the slideway to lock the brackets in place, said means providing for close adjustment of the pattern roll axis transversely thereof.

7. In a graining machine, a main frame, a pattern roll, and a transfer roll supported on said frame, means for supporting said rolls, the support for the pattern roll comprising parallel slideways surmounting the frame, slide blocks for said slideways there being locking devices adapted to hold said blocks on said ways, said locking devices having means associated therewith to effect close adjustment of the pattern roll axis transversely thereof.

8. In a graining machine, a main frame, means for supporting a pattern roll in a plurality of positions on the frame the position depending upon the size of the roll, a drive shaft for the roll and a chain and sprocket connection from the drive shaft to drive the roll, means for turning the drive shaft at a speed determined by the size of the roll, comprising a power driven shaft and a gear fixed thereto an arm pivoted about the axis of the power driven shaft, said arm carrying an intermediate shaft with a gear thereon in mesh with the gear on the power shaft, the first mentioned shaft being adapted to receive gears of the various diameters for meshing with the said gear on the intermediate shaft, whereby the rotational speed of the pattern roll may be changed in accordance with the size thereof without disturbing the chain and sprocket connections.

9. A graining machine, comprising a main frame, a pattern roll shaft supported by the frame and adapted to occupy a plurality of positions depending on the size of the roll carried thereby, a pigment supply mechanism unit, comprising a sub-frame, an ink roll, a shaft therefor, and an ink pan, and means for slidingly supporting the unit for movement in the frame transversely of the ink roll axis, there being a driving shaft for the ink roll carried in a fixed position on the main frame, and a sprocket chain connecting the driving shaft and ink roll shaft, the drive shaft being located equal distances from the two main operating positions of the ink roll shaft, whereby the chain does not have to be changed in substituting one pattern roll size for another.

10. In a graining machine, a pair of side frame members, a transfer roll movably mounted on the side frame members, means to support work in cooperative relation to the transfer roll, mounting devices for pattern rolls of a plurality of sizes in cooperative relation to the transfer roll, said devices comprising inclined supports and bearing blocks carried thereon for such pattern rolls, there being a pigment applying unitary mechanism movable horizontally to different positions on the side frame members to supply pigment to such plurality of sizes of pattern rolls.

In testimony whereof, we hereunto affix our signatures.

GUIDO von WEBERN.
EDWARD WILLIAM HAMANT.